No. 682,399. Patented Sept. 10, 1901.
J. A. ALTENBAUGH.
COMBINED HARROW AND ROLLER.
(Application filed June 7, 1901.)
(No Model.)
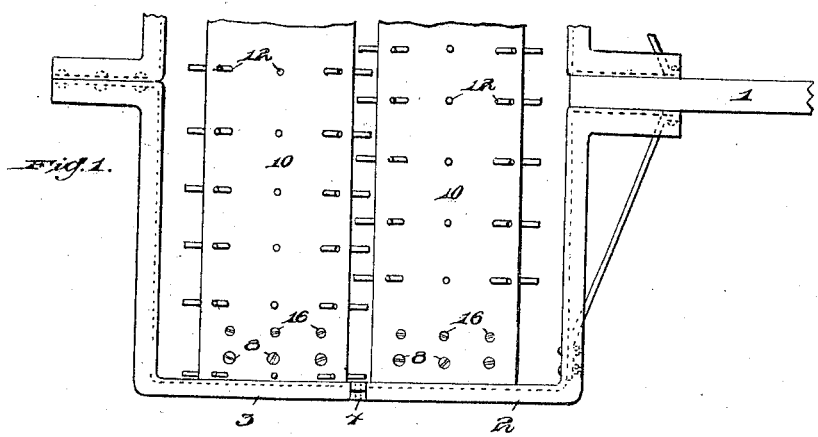
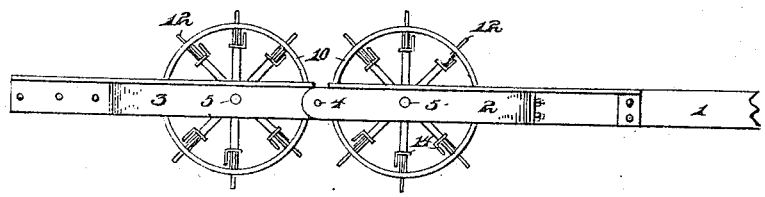
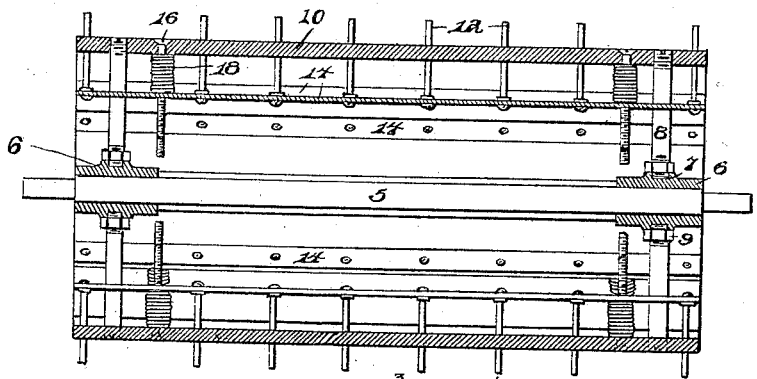
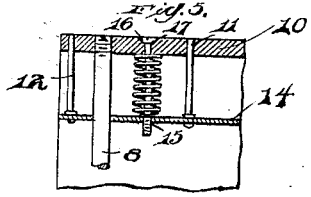
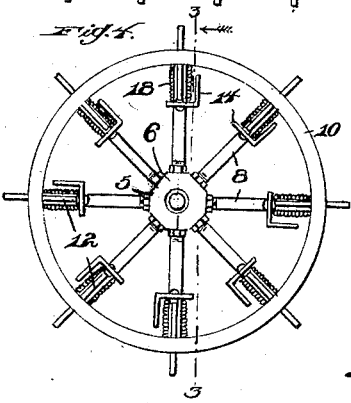
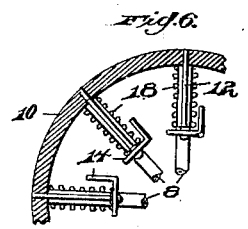

UNITED STATES PATENT OFFICE.

JOHN A. ALTENBAUGH, OF PITTSBURG, PENNSYLVANIA.

COMBINED HARROW AND ROLLER.

SPECIFICATION forming part of Letters Patent No. 682,399, dated September 10, 1901.

Application filed June 7, 1901. Serial No. 63,562. (No model.)

*To all whom it may concern:*

Be it known that I, JOHN A. ALTENBAUGH, a citizen of the United States of America, residing at Pittsburg, in the county of Allegheny and State of Pennsylvania, have invented certain new and useful Improvements in a Combined Harrow and Roller, of which the following is a specification, reference being had therein to the accompanying drawings.

This invention relates to certain new and useful improvements in a combined roller and harrow, and has for its object the provision of novel means whereby rollers may be easily converted into harrows.

The present invention still further aims to construct an implement of the above-described class that will be extremely simple in construction, strong, durable, and comparatively inexpensive to manufacture; furthermore, one that will be highly efficient in its use.

Another object of the invention is to construct a frame portion of two hinged sections that will allow the two sections of the roller or harrow to easily traverse over uneven ground or pass over hilly roads.

With the above and other objects in view the invention consists in the novel combination and arrangement of parts, to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a top plan view of a portion of my improved combined roller and harrow. Fig. 2 is a side elevation thereof. Fig. 3 is a vertical sectional view taken on the line 3 3, Fig. 4, looking in the direction of the arrow. Fig. 4 is an enlarged end elevation of one section of the roller or harrow. Fig. 5 is a longitudinal vertical sectional view of a portion of the roller or harrow. Fig. 6 is a transverse vertical sectional view thereof.

In the drawings the reference-numeral 1 indicates the pole or tongue of the harrow, and 2 3 represents the frame-sections, which are hinged together at 4. In each of these hinged sections is secured a shaft 5, upon which are sleeved hubs 6, said hubs being provided with screw-threaded sockets 7 for the reception of screw-threaded rods 8 and jam-nuts 9. These rods extend radially from the hub outwardly and serve to secure the hollow rollers 10. These hollow rollers have formed therein a series of openings 11, through which extend a corresponding number of harrow-teeth 12, said teeth being arranged in rows upon the angle-irons 14, arranged in the interior of the rollers. Said angle-irons are also provided with screw-threaded openings 15 for the reception of the adjusting-screws 16. These adjusting-screws pass through openings 17, formed in the rollers, and the heads of these screws are countersunk therein. Spiral springs 18 encircle said screws between under face of the roller and upper face of the angle-irons, which springs have a tendency to normally press the angle-irons inwardly and serve to retain the heads of the screws in proper position in the rollers.

The operation of my improved roller and harrow is as follows: We will assume that the implement is in an adjusted position, as shown in Figs. 1, 2, 3, and 4 of the drawings, and is used as a harrow. When it is desired to adjust the harrow-teeth into the interior of the roller, the screws 16 are operated, which will tend to move the angle-irons inwardly, carrying with them the harrow-teeth, which may be adjusted inwardly until the same are flush with the outer face of the roll, and the implement may then be used as a roller and will appear as shown in Figs. 5 and 6 of the drawings.

The many advantages obtained by the use of my improved device will be readily apparent from the foregoing description taken in connection with the accompanying drawings.

It will be noted that various changes may be made in the details of construction without departing from the general spirit of my invention.

Having fully described my invention, what I claim as new, and desire to secure by Letters Patent, is—

1. In a combined roller and harrow, the combination of a hinged frame, rollers rotatably mounted in said frame, a series of harrow-teeth extending through said rollers, and means whereby said harrow-teeth may be adjusted inwardly, substantially as described.

2. In an implement of the character described, the combination of a hinged frame, perforated rollers rotatably secured therein, a series of harrow-teeth adjustably secured in the interior of said rollers, and means whereby said harrow-teeth may be adjusted inwardly and outwardly, through and into said rollers, substantially as described.

3. In a combined harrow and roller, the combination with a frame, perforated rollers rotatably secured therein, angle-irons arranged in said rollers, harrow-teeth secured to said angle-irons, and means whereby said angle-irons are adjusted carrying said teeth through and into said rollers, all parts being arranged and operating substantially as described and for the purpose set forth.

In testimony whereof I affix my signature in the presence of two witnesses.

JOHN A. ALTENBAUGH.

Witnesses:
JOHN NOLAND,
E. E. POTTER.